(12) United States Patent
Cariello

(10) Patent No.: US 12,436,710 B2
(45) Date of Patent: *Oct. 7, 2025

(54) TECHNIQUES FOR SEQUENTIAL ACCESS OPERATIONS

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,980

(22) Filed: May 14, 2024

(65) Prior Publication Data
US 2024/0385771 A1 Nov. 21, 2024

Related U.S. Application Data

(63) Continuation of application No. 17/663,797, filed on May 17, 2022, now Pat. No. 12,014,073.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20;

(Continued)

(56) References Cited

U.S. PATENT DOCUMENTS

| 4,429,363 A * | 1/1984 | Duke | G06F 12/0866 |
|---|---|---|---|
| | | | 711/143 |
| 5,745,418 A * | 4/1998 | Ma | G06F 3/0656 |
| | | | 365/189.16 |

(Continued)

*Primary Examiner* — Daniel C. Chappell
(74) *Attorney, Agent, or Firm* — Holland & Hart LLP

(57) ABSTRACT

Methods, systems, and devices for techniques for sequential access operations are described. In some cases, a memory system may be configured to suppress storing a checkpoint while in a sequential write mode. While in the sequential write mode, the memory system may initiate and store a first a checkpoint, along with an indication that the checkpoint was stored as part of the sequential write mode. Subsequently, the memory system may initiate a second checkpoint and suppress storing the second checkpoint. In some cases, to rebuild an address mapping after an asynchronous power loss, the memory system may access a last stored checkpoint to determine whether the checkpoint was stored as part of a sequential write mode. The memory system may generate logical addresses for data stored after the last checkpoint and before the asynchronous power loss using a starting logical address, as well as an ending logical address.

20 Claims, 9 Drawing Sheets

(58) Field of Classification Search
CPC ........ G06F 2209/00–549; G06F 2211/00–902;
G06F 2212/00–7211; G06F
2213/00–4004; G06F 2216/00–17; G06F
2221/00–2153; G06N 3/00–126; G06N
5/00–048; G06N 7/00–08; G06N 10/00;
G06N 20/00–20; G06N 99/00–007; G06T
1/00–60; G06V 30/00–43; G11B
20/00–24; G11B 33/00–1493; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 2225/00–1094; H03M
7/00–707; H04L 9/00–38; H04L
12/00–66; H04L 41/00–5096; H04L
49/00–9094; H04L 61/00–59; H04L
67/00–75

See application file for complete search history.

(56) References Cited

U.S. PATENT DOCUMENTS

| | | | | |
|---|---|---|---|---|
| 5,818,755 | A * | 10/1998 | Koyanagi | G11C 16/102 365/185.11 |
| 6,145,069 | A * | 11/2000 | Dye | H03M 7/3086 711/170 |
| 6,282,605 | B1 * | 8/2001 | Moore | G06F 16/10 707/999.005 |
| 6,286,092 | B1 * | 9/2001 | Frank | G06F 12/1009 711/E12.066 |
| 8,539,315 | B2 * | 9/2013 | Hashimoto | G11C 29/44 714/763 |
| 8,725,932 | B2 * | 5/2014 | Yano | G06F 12/0246 707/682 |
| 9,032,264 | B2 * | 5/2015 | Hashimoto | G11C 29/08 714/719 |
| 9,099,059 | B2 * | 8/2015 | Sato | G06F 3/147 |
| 9,583,160 | B1 * | 2/2017 | Pekny | G11C 7/04 |
| 9,595,320 | B2 * | 3/2017 | Wu | G11C 16/3454 |
| 10,078,456 | B2 * | 9/2018 | Ly | G06F 13/1615 |
| 10,509,597 | B2 * | 12/2019 | Gaewsky | G06F 3/0659 |
| 11,295,806 | B2 * | 4/2022 | Palmer | G06F 12/1408 |
| 12,014,073 | B2 * | 6/2024 | Cariello | G06F 3/0655 |
| 2002/0101763 | A1 | 8/2002 | Hosogane et al. | |
| 2004/0017798 | A1 * | 1/2004 | Hurtta | H04L 61/45 370/352 |
| 2006/0146433 | A1 | 7/2006 | Chan et al. | |
| 2008/0109589 | A1 * | 5/2008 | Honda | G06F 12/0246 711/E12.008 |
| 2014/0115241 | A1 * | 4/2014 | Wei | G06F 12/0246 711/103 |
| 2014/0181378 | A1 * | 6/2014 | Saeki | G06F 12/0246 711/103 |
| 2014/0281138 | A1 * | 9/2014 | Karamcheti | G06F 11/2058 711/160 |
| 2016/0179386 | A1 * | 6/2016 | Zhang | G06F 3/0679 711/103 |
| 2016/0232124 | A1 | 8/2016 | Zheng et al. | |
| 2017/0160988 | A1 * | 6/2017 | Nemoto | G06F 3/0679 |
| 2020/0019460 | A1 * | 1/2020 | Cadloni | G06F 3/0679 |
| 2020/0090756 | A1 | 3/2020 | Shimura et al. | |
| 2021/0065768 | A1 * | 3/2021 | Palmer | G06F 12/1408 |
| 2021/0173785 | A1 * | 6/2021 | Jin | G06F 12/0246 |
| 2022/0083256 | A1 * | 3/2022 | Muthiah | G06F 3/0604 |
| 2023/0153094 | A1 * | 5/2023 | Cain, Jr. | H04L 67/1097 717/168 |
| 2024/0385771 | A1 * | 11/2024 | Cariello | G06F 3/0679 |

* cited by examiner

TECHNIQUES FOR SEQUENTIAL ACCESS OPERATIONS

CROSS REFERENCE

The present Application for Patent is a Continuation of U.S. patent application Ser. No. 17/663,797 by Cariello, entitled "TECHNIQUES FOR SEQUENTIAL ACCESS OPERATIONS," filed May 17, 2022, which is assigned to the assignee hereof, and is incorporated by reference herein.

FIELD OF TECHNOLOGY

The following relates to one or more systems for memory, including techniques for sequential access operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
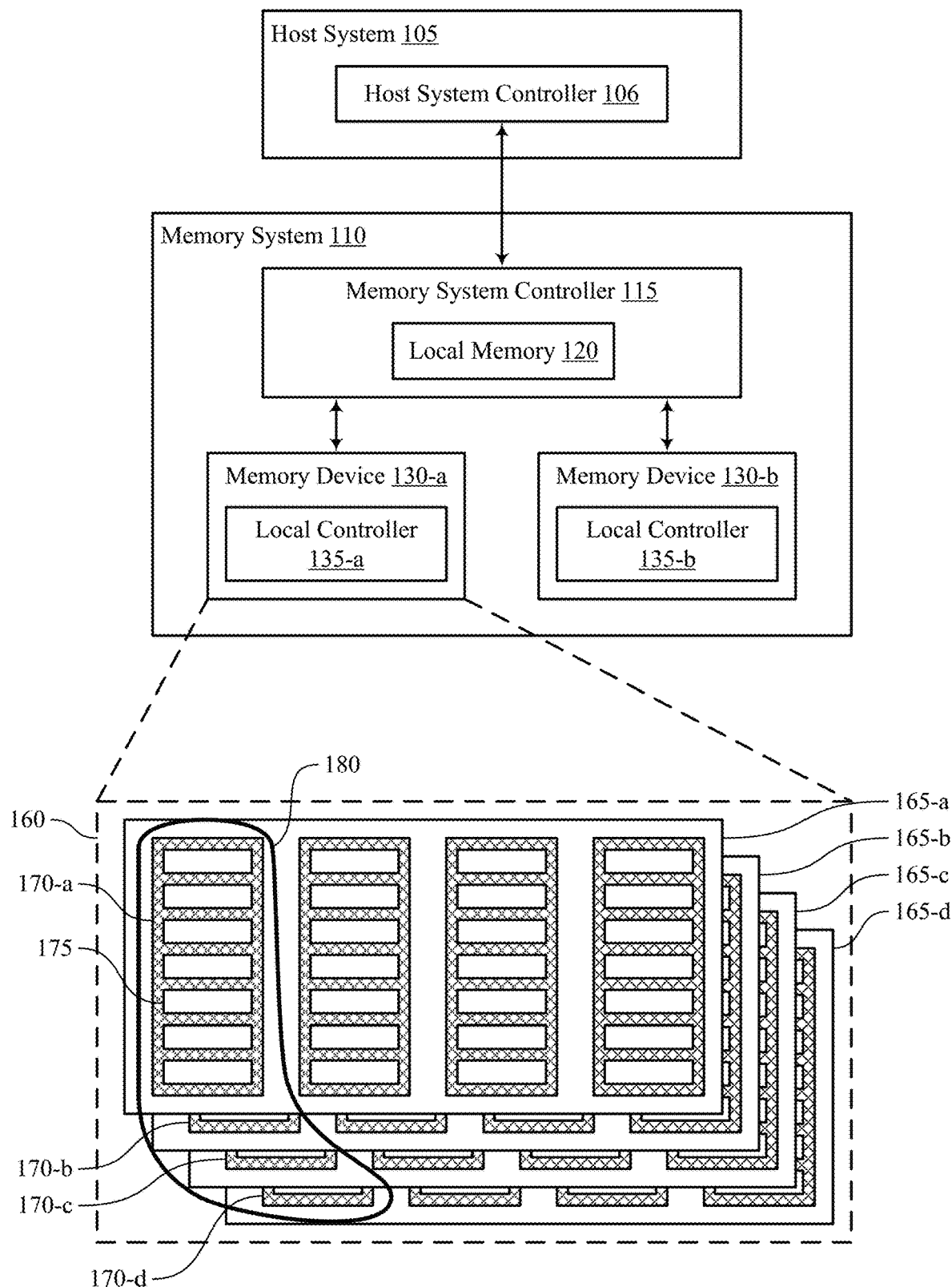
FIG. 1 illustrates an example of a system that supports techniques for sequential access operations in accordance with examples as disclosed herein.

Some memory systems may support a sequential write mode, such as a turbo write or boost mode. In the sequential write mode, the memory system may receive a set of write commands from a host to sequentially store a corresponding set of data. For example, the set of write commands may include a sequential set of logical addresses. In some cases, each command of the set of write commands may include a same size of data. While in the sequential write mode, the memory system may reduce overhead associated with performing the set of write commands, such as by performing a block pre-erase operation, by compressing an address mapping between logical addresses and physical addresses, or both, and accordingly improve system performance (e.g., reduce system latency, increase bandwidth, reduce power consumption or any combination thereof). In order to rebuild the address mapping after an asynchronous power loss, some memory systems may be configured to periodically store a checkpoint which includes an indication of a last valid address mapping, an indication of a last written page of memory cells, or both. In some cases, storing the checkpoint may consume significant system resources, such as time used to store the indications. Accordingly, techniques to reduce overhead associated with a sequential write mode are desired.

As described herein, a memory system may be configured to suppress storing a checkpoint while in a sequential write mode. For example, while in a sequential write mode, the memory system may initiate a first checkpoint. In some cases, if the memory system has not yet stored a checkpoint while in the sequential write mode, the memory system may store the checkpoint, along with an indication that the checkpoint was stored as part of the sequential write mode. Subsequently, the memory system may reach a condition associated with initiating a second checkpoint. In some cases, because the memory system has already stored a checkpoint associated with the sequential write mode, the memory system may suppress (e.g., skip) the second checkpoint. Accordingly, the memory system may reduce overhead associated with a sequential write mode by reducing the quantity of checkpoints stored.

In some cases, in order to rebuild the address mapping after an asynchronous power loss, the memory system may access a last stored checkpoint (e.g., a most recent checkpoint stored prior to the asynchronous power loss) to determine whether the last stored checkpoint was stored as part of a sequential write mode. If the last stored checkpoint was stored as part of a sequential write mode, the memory system may generate logical addresses for data stored after the last checkpoint and before the asynchronous power loss by determining a starting logical address and starting physical address (e.g., the logical address and physical address of a page of memory cells indicated in the checkpoint), as well as an ending logical address and an ending physical address (e.g., the logical address and physical address of a most recently written page of memory cells prior to the asynchronous power loss). Because the data stored after the last checkpoint was stored as part of the sequential write mode, the memory system may generate intermediate logical address corresponding to the data using the starting logical address and the ending logical address.

Figure 2:
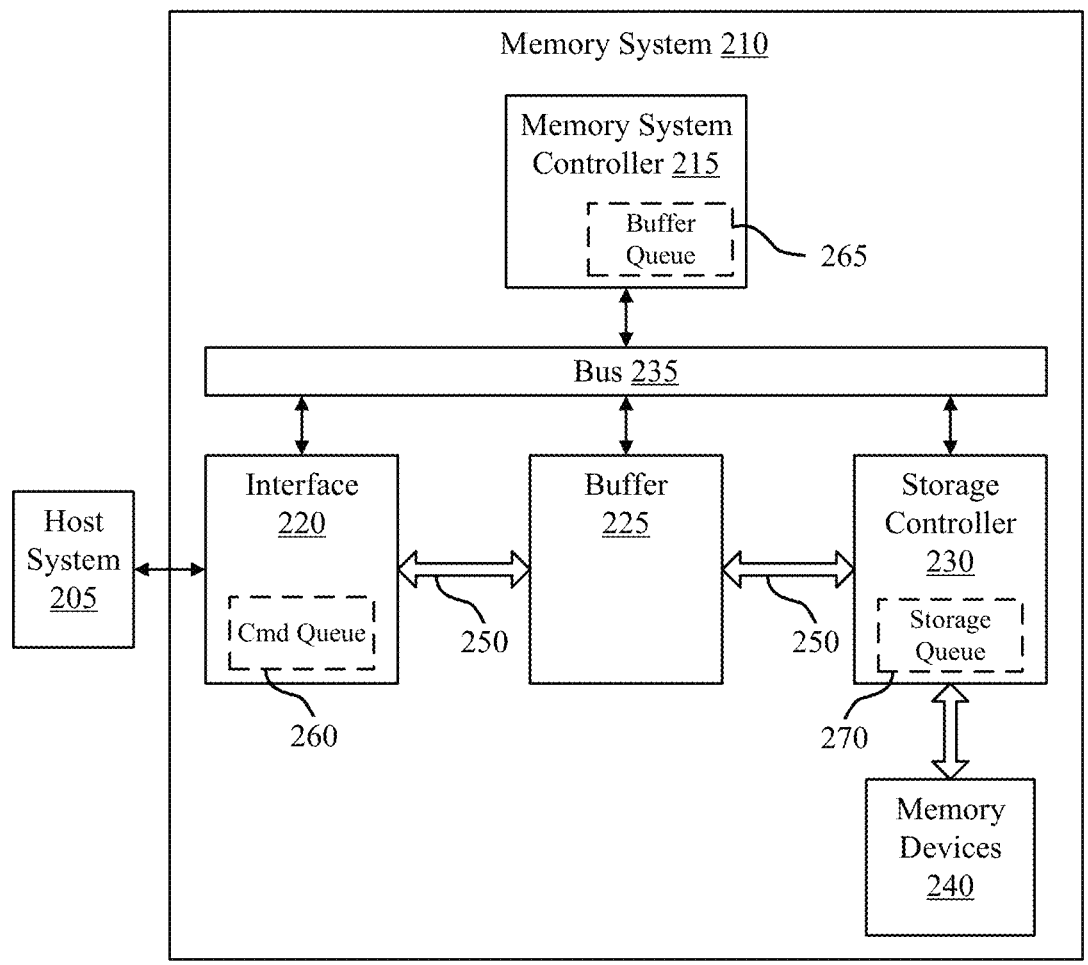
FIG. 2 illustrates an example of a system that supports techniques for sequential access operations in accordance with examples as disclosed herein.

Features of the disclosure are initially described in the context of systems, devices, and circuits with reference to FIGS. 1 through 2. Features of the disclosure are described in the context of a system and process flows with reference to FIGS. 3-6. These and other features of the disclosure are further illustrated by and described in the context of an apparatus diagram and flowchart that relate to techniques for sequential access operations with reference to FIGS. 7-9.

FIG. 1 illustrates an example of a system 100 that supports techniques for sequential access operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support techniques for sequential access operations. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, a memory system 110 may be configured to suppress storing a checkpoint while in a sequential write mode. For example, while in a sequential write mode, a memory system controller 115 of the memory system 110 may store a first a checkpoint. In some cases, if the memory system 110 has not yet stored a checkpoint while in the sequential write mode, the memory system 110 store the checkpoint, along with an indication that the checkpoint was stored as part of the sequential write mode. Subsequently, the memory system 110 may reach a condition associated with storing a second checkpoint. In some cases, because the memory system 110 has already stored a checkpoint associated with the sequential write mode, the memory system 110 may suppress (e.g., skip) the second checkpoint. Accordingly, the memory system 110 may reduce overhead associated with a sequential write mode by reducing the quantity of checkpoints stored.

In some cases, in order to rebuild the address mapping after an asynchronous power loss, the memory system 110 may access a last stored checkpoint (e.g., a most recent checkpoint stored prior to the asynchronous power loss) to determine whether the last stored checkpoint was stored as part of a sequential write mode. If the last stored checkpoint was stored as part of a sequential write mode, the memory system 110 may generate logical addresses for data stored after the last checkpoint and before the asynchronous power loss by determining a starting logical address and starting physical address (e.g., the logical address and physical address of a page of memory cells indicated in the checkpoint), as well as an ending logical address and an ending physical address (e.g., the logical address and physical address of a most recently written page of memory cells prior to the asynchronous power loss). Because the data stored after the last checkpoint was stored as part of the sequential write mode, the memory system 110 may generate intermediate logical address corresponding to the data using the starting logical address and the ending logical address.

FIG. 2 illustrates an example of a system 200 that supports techniques for sequential access operations in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some cases, a memory system 210 may be configured to suppress storing a checkpoint while in a sequential write mode. For example, while in a sequential write mode, a memory system controller 215 of the memory system 210 may store a first a checkpoint. In some cases, if the memory system 210 has not yet stored a checkpoint while in the sequential write mode, the memory system 210 store the checkpoint, along with an indication that the checkpoint was stored as part of the sequential write mode. Subsequently, the memory system 210 may reach a condition associated with storing a second checkpoint. In some cases, because the memory system 210 has already stored a checkpoint associated with the sequential write mode, the memory system 210 may suppress (e.g., skip) the second checkpoint. Accordingly, the memory system 210 may reduce overhead associated with a sequential write mode by reducing the quantity of checkpoints stored.

In some cases, in order to rebuild the address mapping after an asynchronous power loss, the memory system 210 may access a last stored checkpoint (e.g., a most recent checkpoint stored prior to the asynchronous power loss) to determine whether the last stored checkpoint was stored as part of a sequential write mode. If the last stored checkpoint was stored as part of a sequential write mode, the memory system 210 may generate logical addresses for data stored after the last checkpoint and before the asynchronous power loss by determining a starting logical address and starting physical address (e.g., the logical address and physical address of a page of memory cells indicated in the checkpoint), as well as an ending logical address and an ending physical address (e.g., the logical address and physical address of a most recently written page of memory cells prior to the asynchronous power loss). Because the data stored after the last checkpoint was stored as part of the sequential write mode, the memory system 210 may generate intermediate logical address corresponding to the data using the starting logical address and the ending logical address.

Figure 3:
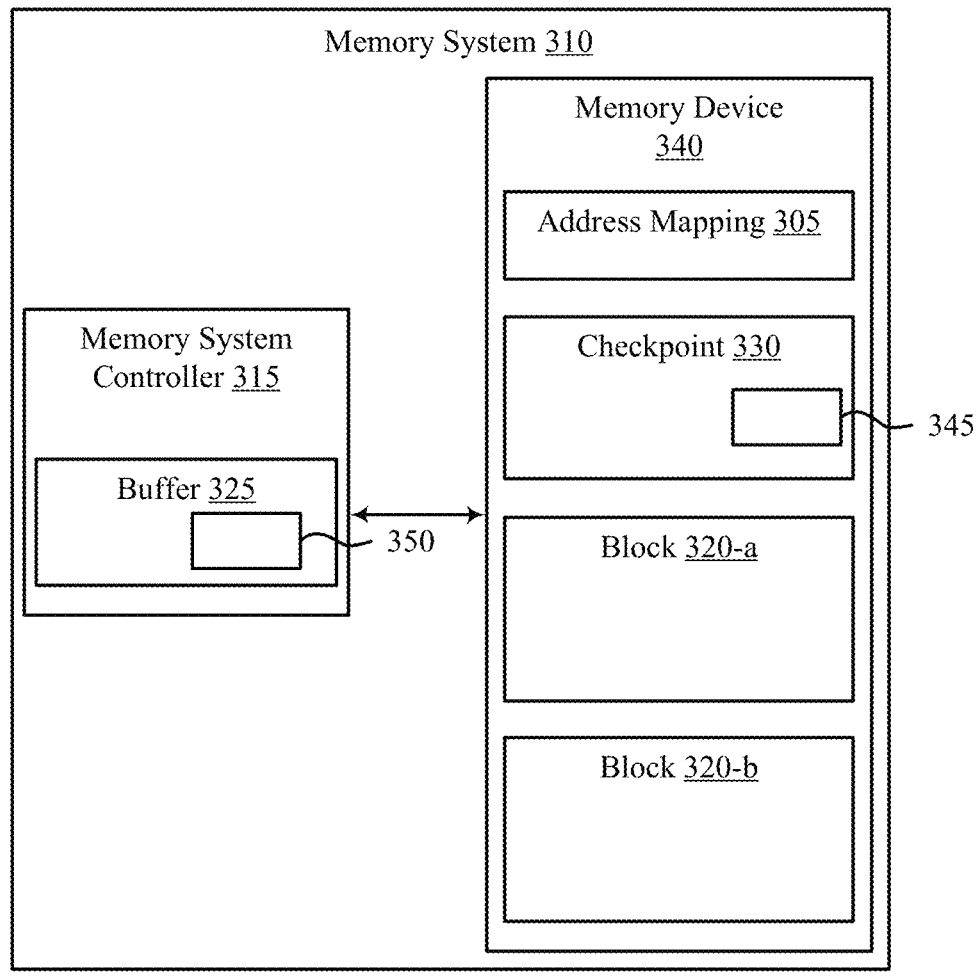
FIG. 3 illustrates an example of a system that supports techniques for sequential access operations in accordance with examples as disclosed herein.

FIG. 3 illustrates an example of a system 300 that supports techniques for sequential access operations in accordance with examples as disclosed herein. The system 300 may include a memory system 310 configured to perform access operations, such as read operations or write operations, associated with data from a host system, which may be examples of the corresponding devices as described with reference to FIGS. 1 and 2. The host system and the memory system 310 may perform a sequential access operation, such as a sequential write operation to store or modify data stored in one or more memory device 340. The memory system 310 may include a memory system controller 315, which may be configured to control or perform aspects or operations associated with access operations or other functions of the memory system 310.

The memory system 310 may receive one or more write commands from the host system. Each write command of the one or more write commands may include or be associated with a respective set of data from the host system, as well as respective metadata, such as a size of the respective data, a logical address of the data, or both. The memory system 310 may temporarily store data associated with a write command, as well as the associated metadata, in volatile storage of the memory system 310, such as in a buffer 325, prior to transferring the data to a block of memory cells of the memory device 340, such as a block of memory cells 320-*a* or a block of memory cells 320-*b*.

In some cases, the one or more write commands may be associated with a sequential write mode. For example, the one or more write commands may be for data associated with a large file and may be associated with a continuous range of logical address and physical addresses. If the memory system 310 determines that the one or more write commands are part of a sequential write, the memory system 310 may enter the sequential write mode. Because the one or more write commands are associated with a continuous range of logical addresses and physical addresses, the memory system 310 may reduce overhead associated with storing data, such as flash translation layer (FTL) information, associated with the one or more write commands, for example using compression techniques, which may increase system performance.

The memory system 310 may determine whether the one or more write commands are part of the sequential write mode based on whether a metric associated with the one or more write commands satisfies a threshold. For example, if a size of data associated with a quantity of the one or more write commands corresponds to a maximum size of data for a write command (e.g., a size of data associated with the one or more write commands satisfies a sequential write threshold), the memory system 310 may determine that the one or more write commands are part of the sequential write mode. Additionally or alternatively, the memory system 310 may determine whether the one or more write commands are associated with the sequential write mode if a threshold quantity of the one or more write commands are sequential. For example, a first command and a second command of the one or more write commands may be sequential if the logical addresses of the second command are sequential with the logical addresses of the first command (e.g., if the first command includes logical addresses of 0 through 511, while the second command includes logical addresses 512-1023, the first command and the second command may be considered sequential).

As part of performing a write command, the memory system 310 may update an address mapping 305 between physical addresses and logical addresses (e.g., an L2P table) to include a mapping between the physical location of the data (e.g., the physical address of the data in the block of memory cells 320-*a* or 320-*b*) and the associated logical address. In some cases, the address mapping 305 may be stored in non-volatile memory of the memory device 340, such as in a block of memory cells. Thus, updating the address mapping 305 may be a relatively resource intensive operation.

Accordingly, prior to updating the address mapping 305, the memory system 310 may store an indication of the associated metadata, such as the logical address of the data, the size of the data, or both (e.g., may accumulate L2P entries), in the volatile buffer 325, for example in a change log 350. In some cases, if a quantity of stored indications has satisfied a threshold (e.g., if the change log 350 is full), the memory system may initiate storing a checkpoint 330. As part of storing the checkpoint 330, the memory system 310 may update the address mapping 305 to include or update the mapping between logical addresses and physical addresses of the data associated with the stored indications (e.g., the data indicated in the change log 350).

If the memory system 310 is in the sequential write mode, the memory system 310 may store in indication 345 that data associated with the checkpoint 330 was written as part of the sequential write mode. In some cases, the indication 345 may be a flag or other stored value indicating that data associated with the checkpoint 330 was written as part of the sequential write mode. For example, a size of data corresponding to the sequential write threshold size may indicate that the data was written as part of the sequential write mode.

In some cases, updating the address mapping 305 may include adjusting a previously stored L2P table, such as by modifying, adding, or removing entries. Additionally or alternatively, updating the address mapping 305 may include storing a new L2P table. In such cases, the memory system may store an indication that the updated address mapping 305 (e.g., the new L2P table) is a valid address mapping 305. As part of storing the checkpoint 330, the memory system 310 may store an indication of a page of memory cells to which the memory system 310 has written data, such as a logical address of the last written page of data.

In some examples, the memory system 310 may initiate storing the checkpoint 330 in response to completing or filling a block of memory cells. For example, if the memory system 310, as part of storing data associated with the one or more commands in the memory device 340, completes or fills a last available page or set of memory cells of a block of memory cells, such as the block of memory cells 320-*a*, the memory system 310 may store an indication that the block of memory cells 320-*a* is full. Subsequently, the memory system 310 may close the block of memory cells 320-*a* and open a new block of memory cells, such as the block of memory cells 320-*b* to store data associated with the one or more write commands in the block of memory cells 320-*b*. As part of closing the block of memory cells 320-*a*, the memory system may store a checkpoint 330 and update the address mapping 305.

In some cases, storing the checkpoint 330 and storing data associated with the one or more write commands may be asynchronous. For example, the data may be stored in the memory device 340 (e.g., in the block of memory cells 320-*a* or the block of memory cells 320-*b*) prior to updating the address mapping 305, such that information associated with the logical addresses of the data may be stored in the buffer 325 (e.g., in the change log 350). However, if the memory system 310 undergoes an unexpected power event (e.g., asynchronous power loss), the information associated with the logical addresses of the data stored in the buffer 325 may be lost or corrupted. In addition, because the change log was not written to the address mapping 305, the address mapping 305 may not accurately represent data stored in the blocks of memory cells 320 after the unexpected power event.

Accordingly, after powering on, the memory system 310 may perform an operation to repair or rebuild the address mapping 305, such as an asynchronous power loss (APL) rebuild operation. As part of the APL rebuild operation, the memory system 310 may read the last stored checkpoint 330 (e.g., the most recent checkpoint 330 stored prior the power loss) to determine the valid address mapping 305 (e.g., a latest updated address mapping 305) and the logical address of the last written page associated with the checkpoint 330. Subsequently, the memory system 310 may determine logical addresses of data stored after the checkpoint 330, for example by reading each page of memory cells with physical addresses subsequent to the physical address of the last written page included in an open block (e.g., the block of memory cells 320-*b*) to determine whether data has been stored in the subsequent pages of memory cells. Because the memory system 310 may use the stored logical address of the last written page as a starting point for rebuilding the address mapping 305, the logical address of the last written page may be referred to as a starting address (and may store an associated starting logical address). In some cases, using metadata stored along with the data, the memory system 310 may recover the associated logical addresses and thus rebuild or recover the address mapping 305.

In some cases, as part of the APL rebuild operation, the memory system may determine whether the checkpoint 330 was stored as part of a sequential write mode. For example, the memory system 310 may read the stored indication 345 of the sequential write mode. If the memory system 310 determines that the checkpoint 330 was stored as part of the sequential write mode, the memory system 310 may determine logical addresses of data stored after the checkpoint 330 using an algorithm (e.g., rather than reading each page of memory cells of the open block of memory cells 320-*b*).

Figure 4:
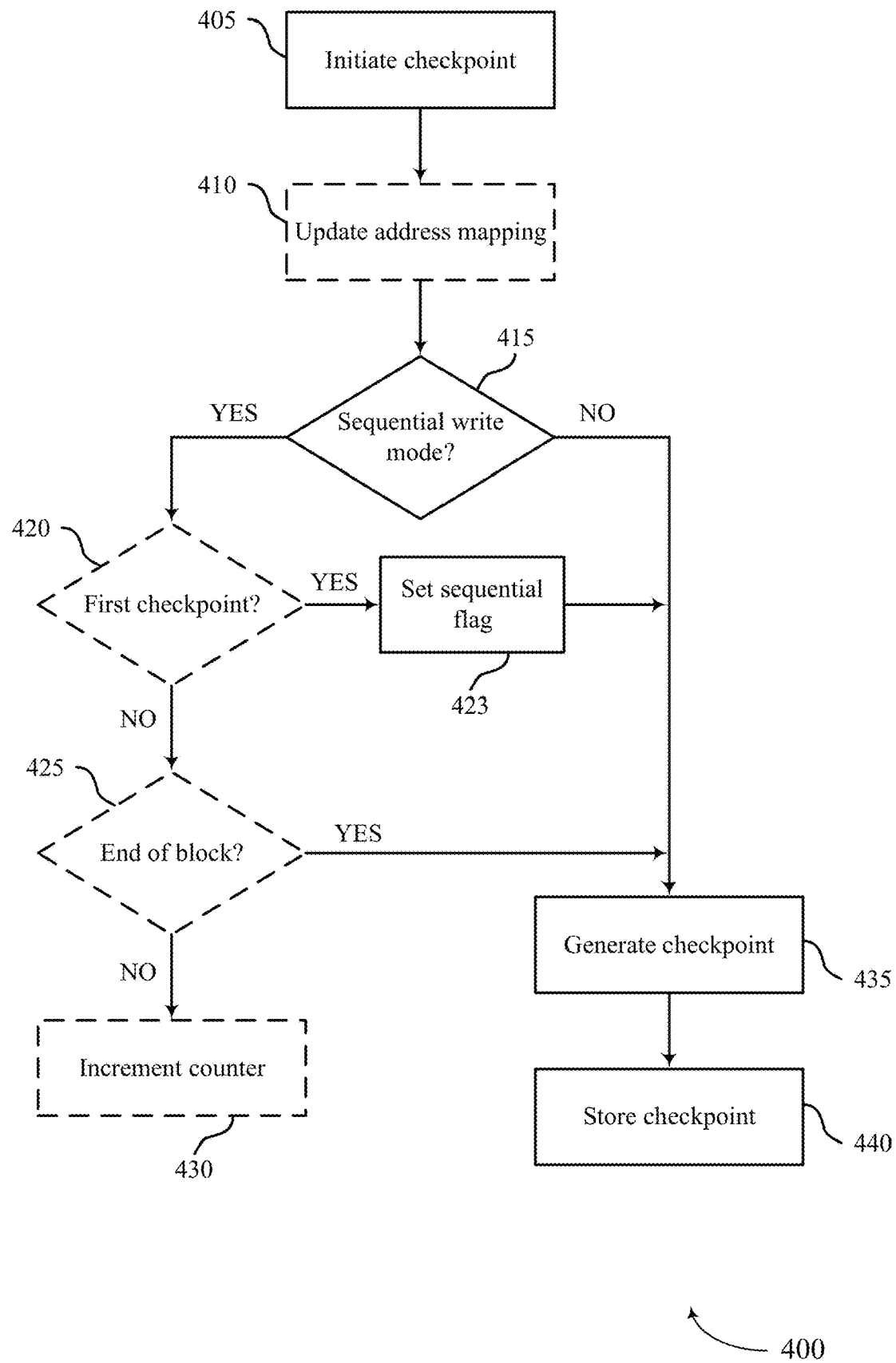
FIG. 4 illustrates an example of a process flow that supports techniques for sequential access operations in accordance with examples as disclosed herein.

FIG. 4 illustrates an example of a process flow 400 that supports techniques for sequential access operations in accordance with examples as disclosed herein. In some examples, process flow 400 may be implemented by aspects of the systems 300. The process flow 400 may include operations performed by a memory system, such as the memory system 310 described with reference to FIG. 3. In the following description of the process flow 400, the operations may be performed in a different order than the order shown. For example, specific operations may also be left out of the process flow 400, or other operations may be added to process flow 400.

The process flow 400 may illustrate an example of initiating a checkpoint to update an address mapping and store an indication of a last written logical address as part of a sequential write mode of the memory system. For example, the memory system may perform aspects of the process flow 400 as part of executing one or more write commands received from a host system. In some cases, the one or more write commands may be part of a sequential write operation. Accordingly, the memory system may execute the one or more commands while in a sequential write mode (e.g., as described with reference to FIG. 3), and may store an indication of the sequential write mode, for example in volatile memory, such as in the buffer.

The process flow 400 may include initiating a checkpoint. For example, at 405, the memory system may initiate the checkpoint in response to a quantity of indications of data stored in a volatile buffer of the memory system and associated with one or more write commands satisfying a threshold. In some cases, the indications of data may include metadata, such as a logical address range for the data, a size of the data, or both. For example, an indication of data may be an example of an entry of a change log. Additionally or alternatively, the checkpoint may be initiated in response to closing a first block of memory cells (e.g., after completing or filling the block of memory cells with data) and opening a second block of memory cells.

In some cases, the process flow 400 may include updating an address mapping. For example, at 410, the memory system may receive a second set of one or more commands not associated with the sequential write mode (e.g., other write commands associated with random write operations or background processes from the host system). Accordingly, the memory system may determine whether a command is associated with the sequential write mode, and may update the address mapping to include logical addresses and physical addresses of data associated with the second set of one or more commands in response to initiating a checkpoint at 405, as described in greater detail with reference to FIG. 6.

The process flow 400 may include determining whether the checkpoint was initiated while in the sequential write mode. For example, at 415, the memory system may determine whether the checkpoint was initiated in sequential write mode using the stored indicator of the sequential write mode. In some cases, the memory system may determine that the checkpoint was not initiated in the sequential write mode. In such cases, the process flow 400 may include generating and storing the checkpoint. For example, at 435, the memory system may prepare the checkpoint by retrieving the change log and issuing a command to update the address mapping and store the checkpoint in a memory device of the memory system. Further, at 440, the memory system may store the checkpoint, for example by executing the commands to update the address mapping and storing the checkpoint in a non-volatile location of the memory device. In some cases, storing the checkpoint may include storing an indication of the updated address mapping, storing an indication, such as a logical address or physical address, of the last written page, storing an indication of the sequential write mode, or any combination thereof.

Additionally or alternatively, if the memory system determines that the checkpoint was initiated as part of the sequential write mode, the process flow 400 may include determining whether the checkpoint is the first checkpoint to be initiated in the sequential write mode. For example, at 420, the memory system may determine whether a counter measuring the quantity of checkpoints initiated in the sequential write mode is greater than zero. In some cases, the memory system may determine that the checkpoint is the first checkpoint to be initiated as part of the sequential write mode (e.g., by determining that the value of the counter is less than or equal to zero). In such cases, the process flow 400 may include, at 423, generating and storing an indication that the checkpoint was initiated in the sequential write mode. Accordingly, the process flow 400 may proceed to 435 and 440, and the memory system generate and store the checkpoint.

In some cases, if the memory system determines that the checkpoint is not the first checkpoint of the sequential write mode (e.g., by determining that the value of the counter is greater than zero). Accordingly, at 425 the process flow 400 may include determining whether the memory device of the memory system has completed (e.g., filled) and closed a block of memory cells, has opened a new block of memory cells, or both. For example, the memory system may determine whether the checkpoint was initiated in response to closing a block of memory cells, opening a block of memory cells, or both. In some cases, the memory system may determine that the checkpoint was initiated in response to closing a block of memory cells, opening a block of memory cells, or both. In such cases, the process flow 400 may proceed to 435 and 440, and the memory system generate and store the checkpoint. In some cases, generating and storing the checkpoint may include generating and storing an indication that the checkpoint was initiated in the sequential write mode.

Additionally or alternatively the memory system may determine that the checkpoint was not initiated in response to closing a block of memory cells, opening a block of memory cells, or both. Accordingly, the process flow 400 may, at 430, include incrementing the value of the counter. In some cases, the value of the counter may indicate a quantity of checkpoints which have been suppressed or skipped as part of sequential write mode. Accordingly, the memory system may not generate or store the checkpoint as part of the sequential write mode. Thus, the memory system may reduce overhead (e.g., storing the checkpoint) associated with the sequential write mode, which may improve utilization of system resources, improve processing speed and bandwidth, decrease power consumption, or any combination thereof.

Aspects of the process flow 400 may be implemented by a controller, among other components. Additionally or alternatively, aspects of the process flow 400 may be implemented as instructions stored in memory (e.g., firmware stored in a memory coupled with a host system 205 or the memory system 310). For example, the instructions, when executed by a controller (e.g., the controller 315), may cause the controller to perform the operations of the process flow 400.

Figure 5:
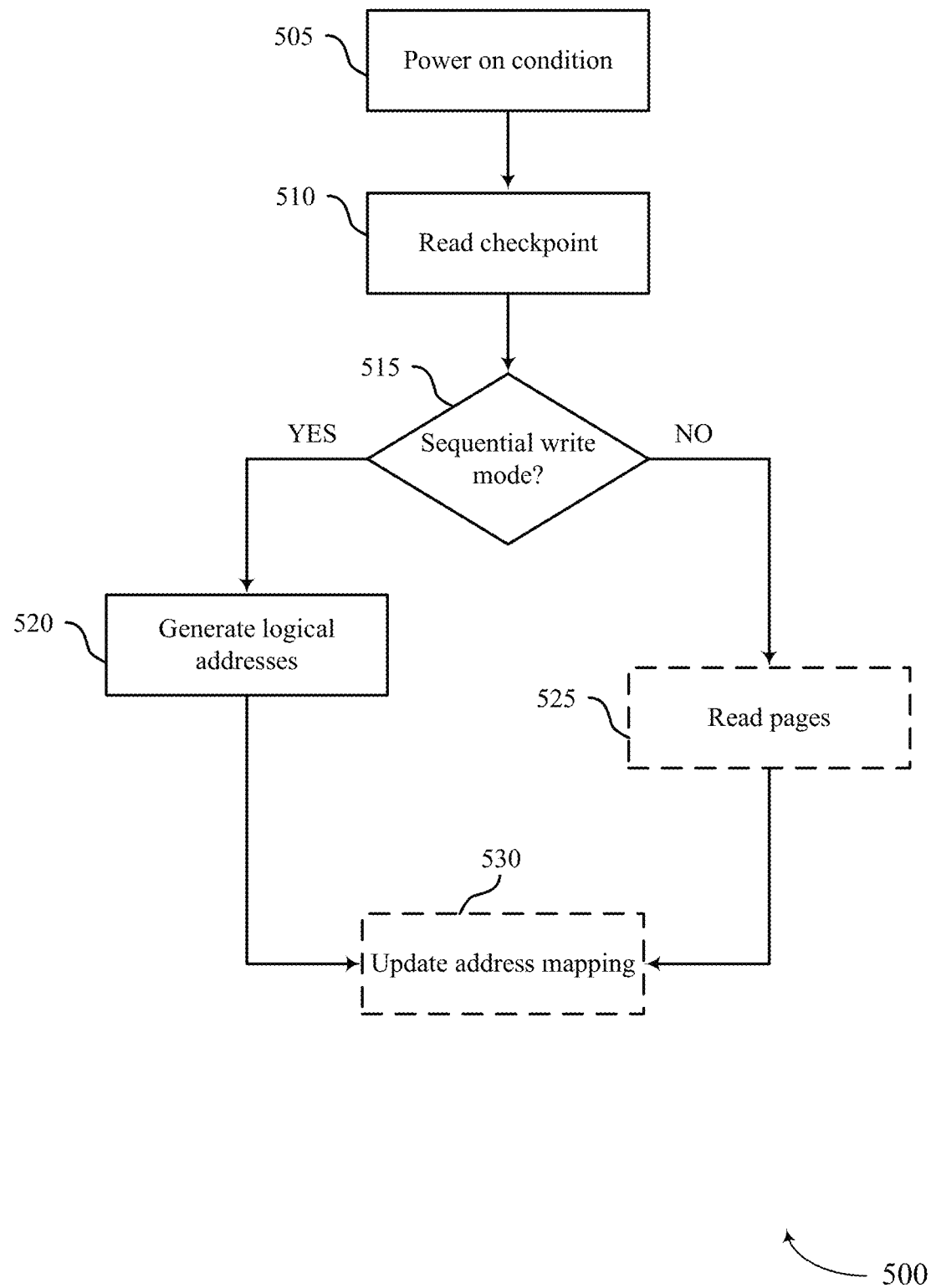
FIG. 5 illustrates an example of a process flow that supports techniques for sequential access operations in accordance with examples as disclosed herein.

FIG. 5 illustrates an example of a process flow 500 that supports techniques for sequential access operations in accordance with examples as disclosed herein. In some examples, process flow 500 may be implemented by aspects of the systems 300. The process flow 500 may include operations performed by a memory system, such as the memory system 310 described with reference to FIG. 3. In the following description of the process flow 500, the operations may be performed in a different order than the order shown. For example, specific operations may also be left out of the process flow 500, or other operations may be added to process flow 500.

In some cases, the memory system may update the address mapping (e.g., the address mapping 305 as described with reference to FIG. 3) and store data to a non-volatile memory device of the memory system asynchronously (e.g., the memory system may store the data in the memory device prior to the memory system updating the address mapping). Accordingly, if the memory system undergoes an asynchronous power loss after storing the data in the memory device but prior to updating the address mapping, any information associated with the data (e.g., logical addresses, physical addresses or both) indicating changes to the address mapping, such as a change log, stored in volatile memory may be lost. Thus, the process flow 500 may illustrate an example of repairing or rebuilding the address mapping (e.g., the L2P table) after the memory system undergoes an asynchronous power loss. For example, the memory system may perform aspects of the process flow 500 as part an APL rebuild operation.

In some cases, the process flow 500 may include determining a power cycle event, such as a power loss followed by a power on condition. For example, at 505, the memory system may determine a power on condition to initiate the APL rebuild operation. In some cases, the memory system may initiate the APL rebuild operation each time the memory system is powered on. For example, the memory system may not be able to determine whether the power on condition followed an asynchronous or unexpected power loss. Accordingly, initiating the APL rebuild operation may be included in a power on procedure for the memory system.

In some cases, the process flow 500 may include reading a checkpoint. For example, at 515, the memory system may read the last recorded checkpoint to determine the last valid address mapping (e.g., the most recently updated L2P table) and a physical address of the last written page of memory cells associated with the checkpoint (e.g., the last written page of memory cells written prior to the checkpoint). In some cases, the last written page of memory cells associated with the checkpoint may be referred to as a starting address for the APL rebuild operation. In some cases, an indication of the last written page of memory cells stored in the checkpoint may include a logical address of the last written page, a physical address of the last written page, or both. For example, if the indication includes a physical address of the last written page of memory cells, the memory system may determine the associated logical address of the last written page of memory cells using metadata stored along with the data of the last written page of memory cells (e.g., the associated logical address may be included in the metadata).

The process flow 500 may include determining whether data stored in the memory device is associated with a sequential write mode. For example, the checkpoint read at 510 may also include an indication, such as a flag, of whether the checkpoint was stored as part of the sequential write mode. Accordingly, at 515, the memory system may determine whether data stored in the memory device is associated with a sequential write mode using the stored indication (e.g., by reading a value of the flag).

In some cases, based on determining that the data stored in the memory device is associated with a sequential write mode, the process flow 500 may include generating intermediate logical addresses for data stored after the checkpoint (e.g., data stored subsequent to the checkpoint being stored). For example, at 520, the memory system may generate logical addresses for data between the starting logical address and an ending logical address. In some cases, the ending logical address may correspond to a most recent logical address of a page of memory cells written prior to the power on condition (e.g., the last page of memory cells written prior to the asynchronous or unexpected power loss). Because the data stored in the memory device may be associated with the sequential write mode, both the intermediate logical addresses and the associated physical addresses may be sequential. Accordingly, the memory system may generate the intermediate logical addresses without reading each page of memory cells between the physical address corresponding to the starting logical address (e.g., the starting physical address) and the physical address corresponding to the ending logical address (e.g., the ending physical address) to determine the respective logical addresses.

In some examples, the memory system may determine the ending logical address and associated physical address using a search operation, such as a binary search. For example, the memory system may access a first page of memory cells between (e.g., approximately half-way between) the physical address corresponding to the starting logical address and the physical address of the end of the block of memory cells containing the starting logical address. If the first page of memory cells contains data (e.g., has been written to), the memory system may access a second page of memory cells between the first page of memory cells and the physical address of the end of the block of memory cells. Alternatively, if the first page of memory cells does has not been written to, the memory system may access a third page of memory cells between the starting logical address and the first page of memory cells, and so on, until the memory system has determined the ending logical address.

Additionally or alternatively, based on determining that the data stored in the memory device is not associated with a sequential write mode, the process flow 500 may include determining logical addresses for data stored after the checkpoint (e.g., data stored subsequent to the checkpoint being stored). For example, at 525, the memory system may determine one or more logical addresses for data stored after the checkpoint by accessing a first physical address subsequent to the starting physical address to determine a corresponding logical address for the first physical address (e.g., using metadata stored at the first physical address). The memory system may then access a second physical address subsequent to the first physical address to determine a corresponding logical address for the second physical, and so on, until the memory system has determine the logical addresses for data stored after the checkpoint in the block of memory cells containing the starting physical address.

In some cases, the process flow 500 may include updating the address mapping. For example, at 530, the memory system may use the intermediary logical addresses determined at 520 or 525 to update the address mapping accessed at 515 to include a mapping between the intermediary logical addresses and corresponding physical addresses. In some cases, updating the address mapping may include adding, modifying or removing entries from the address mapping, or any combination thereof. Additionally or alternatively, updating the address mapping may include generating and storing a new address mapping (e.g., a new L2P table) which includes the mapping between the intermediary logical addresses and corresponding physical addresses.

Aspects of the process flow 500 may be implemented by a controller, among other components. Additionally or alternatively, aspects of the process flow 500 may be implemented as instructions stored in memory (e.g., firmware stored in a memory coupled with a host system 205 or the memory system 310). For example, the instructions, when executed by a controller (e.g., the controller 315), may cause the controller to perform the operations of the process flow 500.

Figure 6:
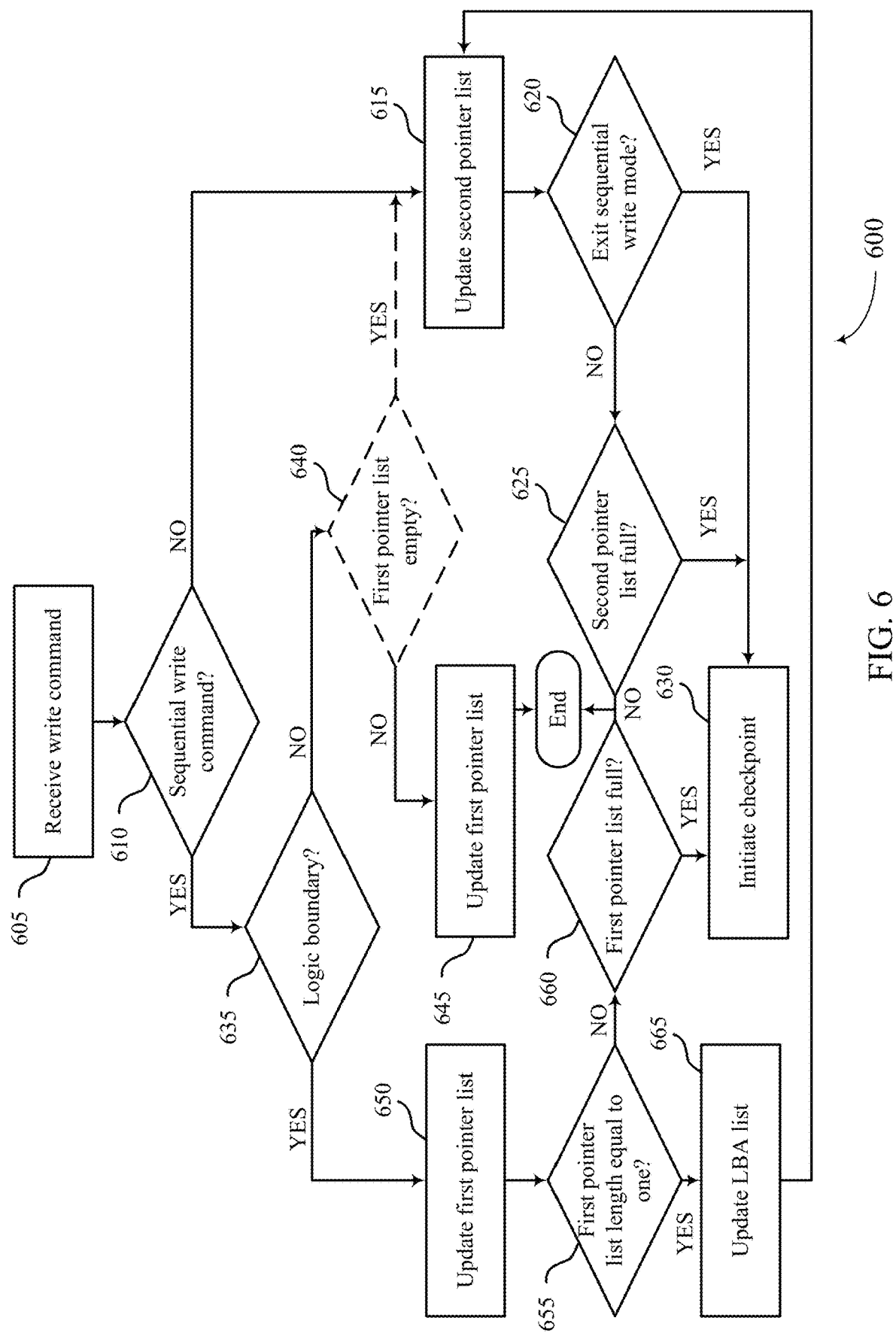
FIG. 6 illustrates an example of a process flow that supports techniques for sequential access operations in accordance with examples as disclosed herein.

FIG. 6 illustrates an example of a process flow 600 that supports techniques for sequential access operations in accordance with examples as disclosed herein. In some examples, process flow 600 may be implemented by aspects of the systems 300. The process flow 600 may include operations performed by a memory system, such as the memory system 310 described with reference to FIG. 3. In the following description of the process flow 600, the operations may be performed in a different order than the order shown. For example, specific operations may also be left out of the process flow 600, or other operations may be added to process flow 600.

The process flow 600 may illustrate an example of the memory system managing a change log (e.g., a change log as described with reference to FIG. 3) to manage write commands received from a host system while the memory system is in a sequential write mode. In some cases, as part of managing the change log, the memory system may maintain one or more pointer lists, such as a compressed pointer list (e.g., a first pointer list) and an uncompressed pointer list (e.g., a second pointer list). The compressed pointer list may include one or more indications of metadata (e.g., pointers) for write commands associated with the sequential write mode, such as an indication of the logical address of data associated with a write command, the physical address of the data, the size of the data, or any combination thereof. In some cases, the compressed pointer list, the uncompressed pointer list, or both may be maintained or stored in volatile memory of the memory system, such as in a buffer of the memory system.

Because the compressed pointer list includes metadata for write commands associated with the sequential write mode, the compressed pointer list may include one or more indications each corresponding to multiple write commands. For example, an indication in the compressed pointer list may include an indication of a starting logical address for data associated with a first write command and an indication of an ending logical address for data associated with a second write command. Accordingly, metadata for data associated with intermediate write commands (e.g., intermediate logical addresses between the starting logical address and the ending logical address) may be generated using the starting logical address and the ending logical address without storing an indication of the intermediate logical addresses in the compressed pointer list. In some cases, an indication in the compressed pointer list may correspond to a predetermined size of data or quantity of write commands (e.g., each indication in the compressed pointer list may correspond to four write commands). In such cases, the starting logical address and the ending logical address of the indication may be referred to as the logic boundary of the indication.

In some cases, the uncompressed pointer list may include indications of metadata for write commands not associated with the sequential write mode. For example, if the memory system receives a write command while in the sequential write mode to store first data not associated with the sequential write mode (e.g., data with a logical address which is not sequential with the logical addresses associated with the sequential write mode), the memory system may store an indication of the metadata corresponding to the first data in the uncompressed pointer list. In some cases, the memory system may receive write commands not associated with the sequential write mode while in the sequential write mode due to random noise from background processes of the host system.

In some cases, the process flow 600 may include receiving a write command. For example, at 605, the memory system may receive a write command while in the sequential write mode. Accordingly, the memory system may, at 610, determine whether the write command is associated with the sequential write mode. For example, the memory system may determine that a logical address for data associated with the write command is not sequential with previous logical addresses for data associated with the sequential write mode, and may thus determine that the write command is not associated with the sequential write mode. In some examples, the memory system may determine that the write command is not associated with the sequential write mode despite determining that a logical address for data associated with the write command is sequential with previous logical addresses for data associated with the sequential write mode. For example, if the memory system determines to store the data in a last section of a block of memory cells, but a size of the data is not sufficient to fill the last section of the block of memory cells, the memory system may determine that the write command is not associated with the sequential write mode.

In some cases, the process flow 600 may include updating the uncompressed pointer list. For example, at 615 and in response to determining that the write command is not associated with the sequential write mode, the memory system may insert or add to the uncompressed pointer a mapping to include a mapping between a logical address for the data and a physical address for the data. In some cases, if the write command is associated with multiple logical addresses (e.g., a range of logical addresses), updating the uncompressed pointer list may include inserting or adding a mapping for each logical address and corresponding physical address included in the write command.

In some examples, the process flow 600 may include determining whether to exit or end the sequential write mode. For example, at 620, if a quantity of write commands received by the memory system (e.g., in addition to the write command received at 605) not associated with the sequential write mode exceeds a threshold, the memory system may determine to exit the sequential write mode. In some cases, upon exiting the sequential write mode, the memory system may, at 630, initiate a checkpoint and subsequently store the checkpoint in a non-volatile memory of the memory system.

Additionally or alternatively, if the memory system does not determine to exit the sequential write mode (e.g., if the quantity of write commands not associated with the sequential write mode does not exceed the threshold), the process flow 600 may include determining whether the uncompressed pointer list is full. For example, at 625, the memory system may determine whether a quantity of indications included in the uncompressed pointer list exceeds an upper bound of or maximum size for the uncompressed pointer list, the memory system may determine that the uncompressed pointer list is full, and accordingly proceed to 630 to initiate a checkpoint.

In some cases, at 610, the memory system may determine that a logical address for data associated with the write command is sequential with previous logical addresses for data associated with the sequential write mode, and may thus determine that the write command is associated with the sequential write mode. Accordingly, the process flow 600 may include determining whether the logical addresses associated with the write command cross or exceed the logic boundary of a current indication in the compressed pointer list (e.g., whether the range associated with the write command exceeds the range covered by a single compressed pointer). For example, at 635, the memory system may determine whether the logical address associated with the write command exceeds the logic boundary of the current indication.

In some cases, based on determining that the logical address associated with the write command does not cross the logic boundary of a current indication, the process flow 600 may include determining whether the compressed pointer list is empty. For example, at 640, the memory system may determine whether the compressed pointer list is empty. If the memory system determine that the compressed pointer list is empty, the memory system may, at 645, update the compressed pointer list to include the logical address associated with the write command. For example, the memory system may adjust the ending logical address of the current indication to correspond to the logical address associated with the write command. In some cases, if the memory system determines that the compressed pointer list is not empty, the memory system may include the logical address associate with the write command in the uncompressed pointer list. Accordingly, the process flow 600 may proceed to 615.

In some cases, based on determining that the logical address associated with the write command crosses or exceeds the logic boundary of the current indication, the process flow 600 may include updating the compressed pointer list. For example, at 650, the memory system may modify the compressed pointer list to include the current indication. In some cases, the current indication may point to a partially written range (e.g., a partially written set of memory cells of a currently open block of memory cells). Accordingly, the memory system may add the logical addresses associated with the partially written range to the uncompressed pointer list.

In some cases, the process flow 600 may include determining whether the length of the compressed pointer list is equal to one. For example, at 655, the memory system may determine whether the compressed pointer list includes multiple indications (and thus has a length greater than one), or whether the compressed pointer list includes a single entry. In some cases, if the memory system determines that the compressed pointer list includes multiple indications, the memory system may, at 660, determine that a quantity of indications included in the compressed pointer list exceeds an upper bound of or maximum size for the compressed pointer list and accordingly proceed to 630 to initiate a checkpoint.

In some cases, based on determining that the length of the compressed pointer list is equal to one at 655, the process flow 655 may include updating a logical block address (LBA) list. For example, at 665, if a portion the sequential workload associated with the sequential write mode starts from an LBA that is not aligned with an indication included in the compressed pointer list, the portion may be added to the uncompressed pointer list. Accordingly, the process flow 600 may proceed to 615 to include the portion in the uncompressed pointer list.

Aspects of the process flow 600 may be implemented by a controller, among other components. Additionally or alternatively, aspects of the process flow 600 may be implemented as instructions stored in memory (e.g., firmware stored in a memory coupled with a host system 205 or the memory system 310). For example, the instructions, when executed by a controller (e.g., the controller 315), may cause the controller to perform the operations of the process flow 600.

Figure 7:
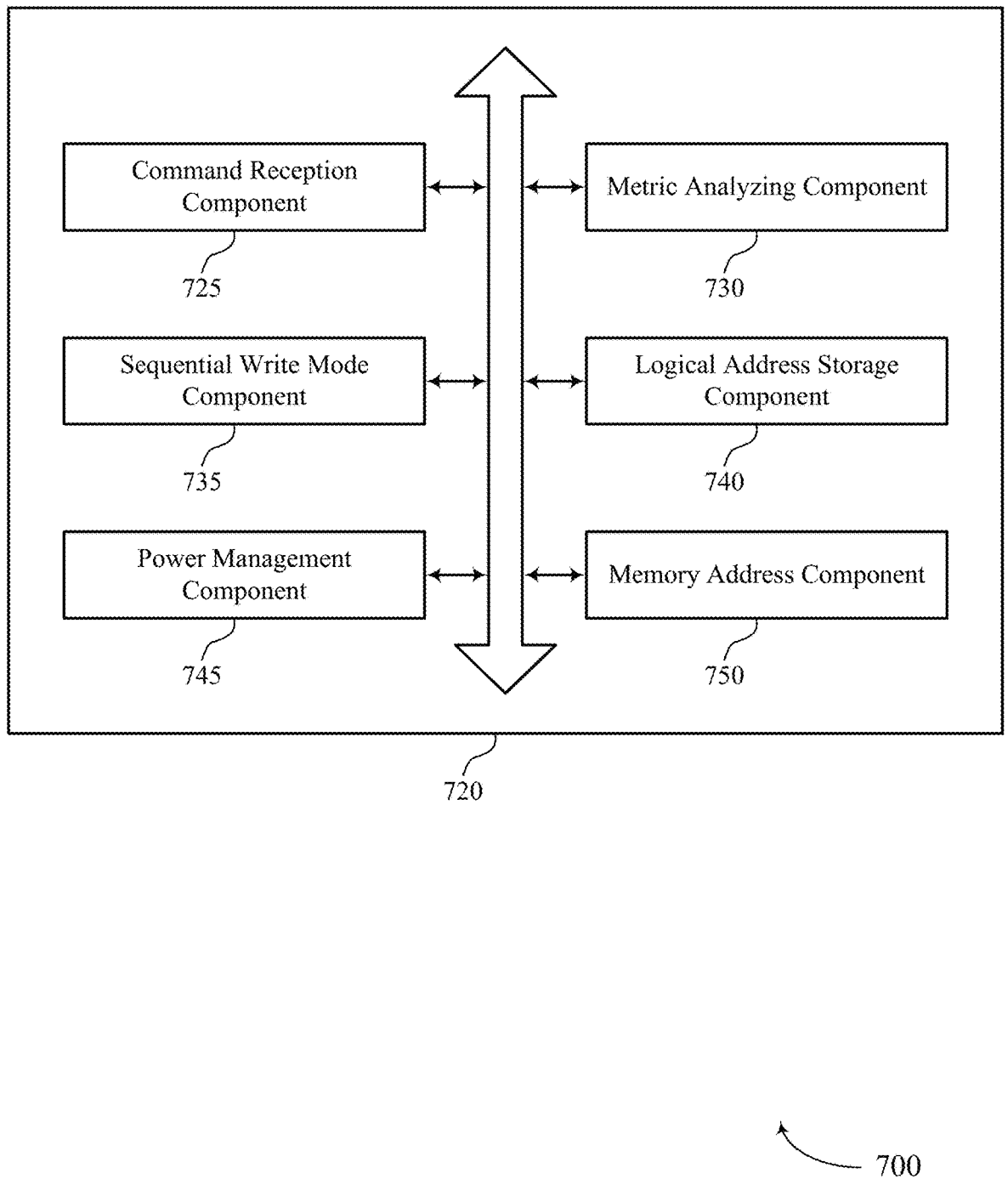
FIG. 7 shows a block diagram of a managed memory system that supports techniques for sequential access operations in accordance with examples as disclosed herein.

FIG. 7 shows a block diagram 700 of a managed memory system 720 that supports techniques for sequential access operations in accordance with examples as disclosed herein. The managed memory system 720 may be an example of aspects of a managed memory system as described with reference to FIGS. 1 through 6. The managed memory system 720, or various components thereof, may be an example of means for performing various aspects of techniques for sequential access operations as described herein. For example, the managed memory system 720 may include a command reception component 725, a metric analyzing component 730, a sequential write mode component 735, a logical address storage component 740, a power management component 745, a memory address component 750, or any combination thereof. Each of these components may communicate, directly or indirectly, with one another (e.g., via one or more buses).

The command reception component 725 may be configured as or otherwise support a means for receiving, at a memory system, a plurality of write commands. The metric analyzing component 730 may be configured as or otherwise support a means for determining whether a metric associated with the plurality of write commands satisfies a threshold based at least in part on respective logical addresses of the plurality of write commands. The sequential write mode component 735 may be configured as or otherwise support a means for initiating, based at least in part determining that the metric satisfies the threshold, a sequential write mode. The logical address storage component 740 may be configured as or otherwise support a means for storing, in the non-volatile memory based at least in part on initiating the sequential write mode, an indication of a starting logical address associated with data associated with the plurality of write commands. In some examples, the sequential write mode component 735 may be configured as or otherwise support a means for storing, in the non-volatile memory based at least in part on initiating the sequential write mode, an indication of the sequential write mode.

In some examples, the memory address component 750 may be configured as or otherwise support a means for updating a mapping between logical addresses associated with the data and physical addresses associated with the data based at least in part on initiating the sequential write mode.

In some examples, the metric is based at least in part on a quantity of the plurality of write commands being sequential.

In some examples, the metric is based at least in part on a size of data associated with each write command of the plurality of write commands satisfying the threshold.

In some examples, the sequential write mode component 735 may be configured as or otherwise support a means for detecting a condition to store an indication of a second starting logical address associated with the data in the non-volatile memory. In some examples, the sequential write mode component 735 may be configured as or otherwise support a means for suppress storing the indication of the second starting logical address in the non-volatile memory based at least in part on the indication of the sequential write mode.

In some examples, the sequential write mode component 735 may be configured as or otherwise support a means for updating a value of a counter indicating a quantity of suppressed indications, where the suppressing is based at least in part on the value of the counter.

In some examples, the command reception component 725 may be configured as or otherwise support a means for receiving, at the memory system, a second plurality of write commands. In some examples, the metric analyzing component 730 may be configured as or otherwise support a means for determining whether a second metric associated with the second plurality of write commands satisfies a second threshold based at least in part on a respective logical address of each write command of the second plurality of write commands.

In some examples, the sequential write mode component 735 may be configured as or otherwise support a means for exiting the sequential write mode based at least in part on determining that the second metric satisfies the second threshold. In some examples, the memory address component 750 may be configured as or otherwise support a means for updating a mapping between logical addresses and physical addresses based at least in part on exiting the sequential write mode.

In some examples, the second metric is based at least in part on a quantity of the plurality of write commands that are non-sequential.

In some examples, the second metric is based at least in part on a second size of data associated with at least one write command of the second plurality of write commands being different than a size of data associated with each write command of the plurality of write commands.

In some examples, the memory address component 750 may be configured as or otherwise support a means for determining whether the data associated with the plurality of write commands fills a block of memory cells of the non-volatile memory based at least in part on storing the data. In some examples, the memory address component 750 may be configured as or otherwise support a means for updating a mapping between logical addresses associated with the data and physical addresses associated with the data in the non-volatile memory based at least in part on the determining.

In some examples, the memory address component 750 may be configured as or otherwise support a means for compressing the mapping between logical addresses and physical addresses based at least in part on the starting logical address associated with the data and an ending logical address associated with the data.

In some examples, the command reception component 725 may be configured as or otherwise support a means for receiving, at the memory system and while in the sequential write mode, a write command. In some examples, the logical address storage component 740 may be configured as or otherwise support a means for determining whether second data associated with the write command is sequential with the data associated with the plurality of write commands based at least in part on a first logical address of the data associated with the write command. In some examples, the logical address storage component 740 may be configured as or otherwise support a means for storing, based at least in part on determining that the second data is sequential with the data associated with the plurality of write commands, an indication of the logical address in a first pointer list.

In some examples, the command reception component 725 may be configured as or otherwise support a means for receiving, at the memory system and while in the sequential write mode, a second write command. In some examples, the logical address storage component 740 may be configured as or otherwise support a means for determining whether third data associated with the second write command is sequential with the second data based at least in part on a second logical address of the third data associated with the second write command. In some examples, the logical address storage component 740 may be configured as or otherwise support a means for storing, based at least in part on determining that the third data is not sequential with the second data, an indication of the second logical address in a second pointer list, where the first pointer list includes a compressed pointer list and the second pointer list includes an uncompressed pointer list.

The power management component 745 may be configured as or otherwise support a means for determining a power on condition of a memory system, where the memory system includes a non-volatile memory. In some examples, the sequential write mode component 735 may be configured as or otherwise support a means for determining, based at least in part on determining the power on condition, whether data stored in the non-volatile memory is associated with a sequential write mode based at least in part on a stored indication of the sequential write mode. The memory address component 750 may be configured as or otherwise support a means for generating, based at least in part on determining that the data is associated with the sequential write mode, a plurality of intermediate logical addresses associated with the data, the plurality of intermediate logical addresses based at least in part on an indication of a starting logical address for the data stored in the non-volatile memory and an ending logical address for the data.

In some examples, to support, generating the plurality of intermediate logical addresses, the memory address component 750 may be configured as or otherwise support a means for retrieving the indication of the starting logical address from the non-volatile memory. In some examples, to support, generating the plurality of intermediate logical addresses, the memory address component 750 may be configured as or otherwise support a means for determining the ending logical address based at least in part performing a search on a set of memory cells of the non-volatile memory, the set of memory cells starting from a starting physical address associated with the starting logical address.

In some examples, the memory address component 750 may be configured as or otherwise support a means for updating a mapping between logical addresses associated with the data and physical addresses associated with the data based at least in part on the plurality of intermediate logical addresses.

Figure 8:
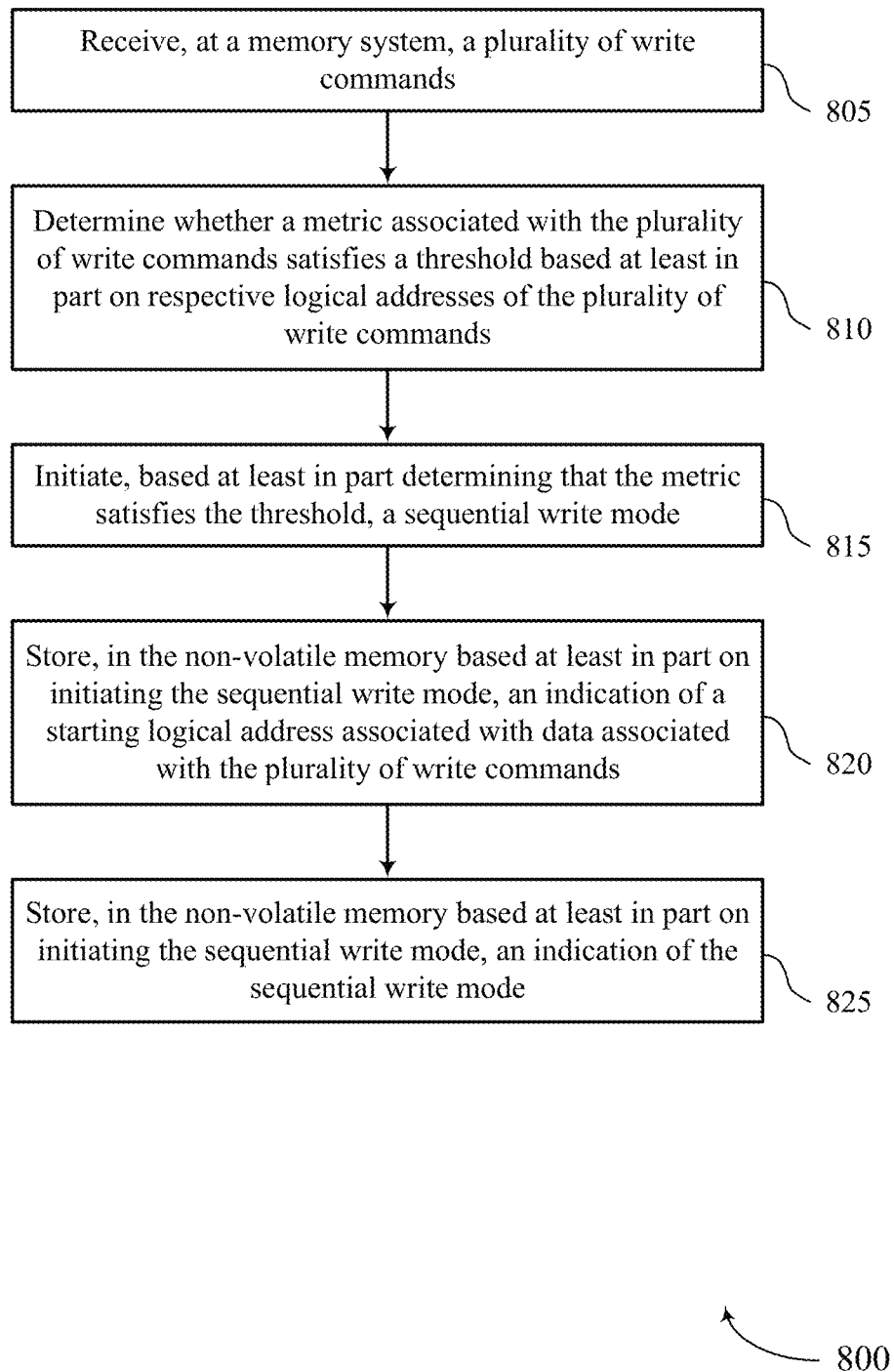
FIGS. 8 and 9 show flowcharts illustrating a method or methods that support techniques for sequential access operations in accordance with examples as disclosed herein.

FIG. 8 shows a flowchart illustrating a method 800 that supports techniques for sequential access operations in accordance with examples as disclosed herein. The operations of method 800 may be implemented by a managed memory system or its components as described herein. For example, the operations of method 800 may be performed by a managed memory system as described with reference to FIGS. 1 through 7. In some examples, a managed memory system may execute a set of instructions to control the functional elements of the device to perform the described functions. Additionally or alternatively, the managed memory system may perform aspects of the described functions using special-purpose hardware.

At 805, the method may include receiving, at a memory system, a plurality of write commands. The operations of 805 may be performed in accordance with examples as disclosed herein. In some examples, aspects of the operations of 805 may be performed by a command reception component 725 as described with reference to FIG. 7.

At 810, the method may include determining whether a metric associated with the plurality of write commands satisfies a threshold based at least in part on respective logical addresses of the plurality of write commands. The operations of 810 may be performed in accordance with examples as disclosed herein. In some examples, aspects of the operations of 810 may be performed by a metric analyzing component 730 as described with reference to FIG. 7.

At 815, the method may include initiating, based at least in part determining that the metric satisfies the threshold, a sequential write mode. The operations of 815 may be performed in accordance with examples as disclosed herein. In some examples, aspects of the operations of 815 may be performed by a sequential write mode component 735 as described with reference to FIG. 7.

At 820, the method may include storing, in the non-volatile memory based at least in part on initiating the sequential write mode, an indication of a starting logical address associated with data associated with the plurality of write commands. The operations of 820 may be performed in accordance with examples as disclosed herein. In some examples, aspects of the operations of 820 may be performed by a logical address storage component 740 as described with reference to FIG. 7.

At 825, the method may include storing, in the non-volatile memory based at least in part on initiating the sequential write mode, an indication of the sequential write mode. The operations of 825 may be performed in accordance with examples as disclosed herein. In some examples, aspects of the operations of 825 may be performed by a sequential write mode component 735 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, a plurality of write commands; determining whether a metric associated with the plurality of write commands satisfies a threshold based at least in part on respective logical addresses of the plurality of write commands; initiating, based at least in part determining that the metric satisfies the threshold, a sequential write mode; storing, in the non-volatile memory based at least in part on initiating the sequential write mode, an indication of a starting logical address associated with data associated with the plurality of write commands; and storing, in the non-volatile memory based at least in part on initiating the sequential write mode, an indication of the sequential write mode.

Aspect 2: The method, apparatus, or non-transitory computer-readable medium of aspect 1, further including operations, features, circuitry, logic, means, or instructions, or any combination thereof for updating a mapping between logical addresses associated with the data and physical addresses associated with the data based at least in part on initiating the sequential write mode.

Aspect 3: The method, apparatus, or non-transitory computer-readable medium of any of aspects 1 through 2 where the metric is based at least in part on a quantity of the plurality of write commands being sequential.

Aspect 4: The method, apparatus, or non-transitory computer-readable medium of any of aspects 1 through 3 where the metric is based at least in part on a size of data associated with each write command of the plurality of write commands satisfying the threshold.

Aspect 5: The method, apparatus, or non-transitory computer-readable medium of any of aspects 1 through 4, further including operations, features, circuitry, logic, means, or instructions, or any combination thereof for detecting a condition to store an indication of a second starting logical address associated with the data in the non-volatile memory and suppress storing the indication of the second starting logical address in the non-volatile memory based at least in part on the indication of the sequential write mode.

Aspect 6: The method, apparatus, or non-transitory computer-readable medium of aspect 5, further including operations, features, circuitry, logic, means, or instructions, or any combination thereof for updating a value of a counter indicating a quantity of suppressed indications, where the suppressing is based at least in part on the value of the counter.

Aspect 7: The method, apparatus, or non-transitory computer-readable medium of any of aspects 1 through 6, further including operations, features, circuitry, logic, means, or instructions, or any combination thereof for receiving, at the memory system, a second plurality of write commands and determining whether a second metric associated with the second plurality of write commands satisfies a second threshold based at least in part on a respective logical address of each write command of the second plurality of write commands.

Aspect 8: The method, apparatus, or non-transitory computer-readable medium of aspect 7, further including operations, features, circuitry, logic, means, or instructions, or any combination thereof for exiting the sequential write mode based at least in part on determining that the second metric satisfies the second threshold and updating a mapping between logical addresses and physical addresses based at least in part on exiting the sequential write mode.

Aspect 9: The method, apparatus, or non-transitory computer-readable medium of any of aspects 7 through 8 where the second metric is based at least in part on a quantity of the plurality of write commands that are non-sequential.

Aspect 10: The method, apparatus, or non-transitory computer-readable medium of any of aspects 7 through 9 where the second metric is based at least in part on a second size of data associated with at least one write command of the second plurality of write commands being different than a size of data associated with each write command of the plurality of write commands.

Aspect 11: The method, apparatus, or non-transitory computer-readable medium of any of aspects 1 through 10, further including operations, features, circuitry, logic, means, or instructions, or any combination thereof for determining whether the data associated with the plurality of write commands fills a block of memory cells of the non-volatile memory based at least in part on storing the data and updating a mapping between logical addresses associated with the data and physical addresses associated with the data in the non-volatile memory based at least in part on the determining.

Aspect 12: The method, apparatus, or non-transitory computer-readable medium of aspect 11, further including operations, features, circuitry, logic, means, or instructions, or any combination thereof for compressing the mapping between logical addresses and physical addresses based at least in part on the starting logical address associated with the data and an ending logical address associated with the data.

Aspect 13: The method, apparatus, or non-transitory computer-readable medium of any of aspects 1 through 12, further including operations, features, circuitry, logic, means, or instructions, or any combination thereof for receiving, at the memory system and while in the sequential write mode, a write command; determining whether second data associated with the write command is sequential with the data associated with the plurality of write commands based at least in part on a first logical address of the data associated with the write command; and storing, based at least in part on determining that the second data is sequential with the data associated with the plurality of write commands, an indication of the logical address in a first pointer list.

Aspect 14: The method, apparatus, or non-transitory computer-readable medium of aspect 13, further including operations, features, circuitry, logic, means, or instructions, or any combination thereof for receiving, at the memory system and while in the sequential write mode, a second write command; determining whether third data associated with the second write command is sequential with the second data based at least in part on a second logical address of the third data associated with the second write command; and storing, based at least in part on determining that the third data is not sequential with the second data, an indication of the second logical address in a second pointer list, where the first pointer list includes a compressed pointer list and the second pointer list includes an uncompressed pointer list.

Figure 9:
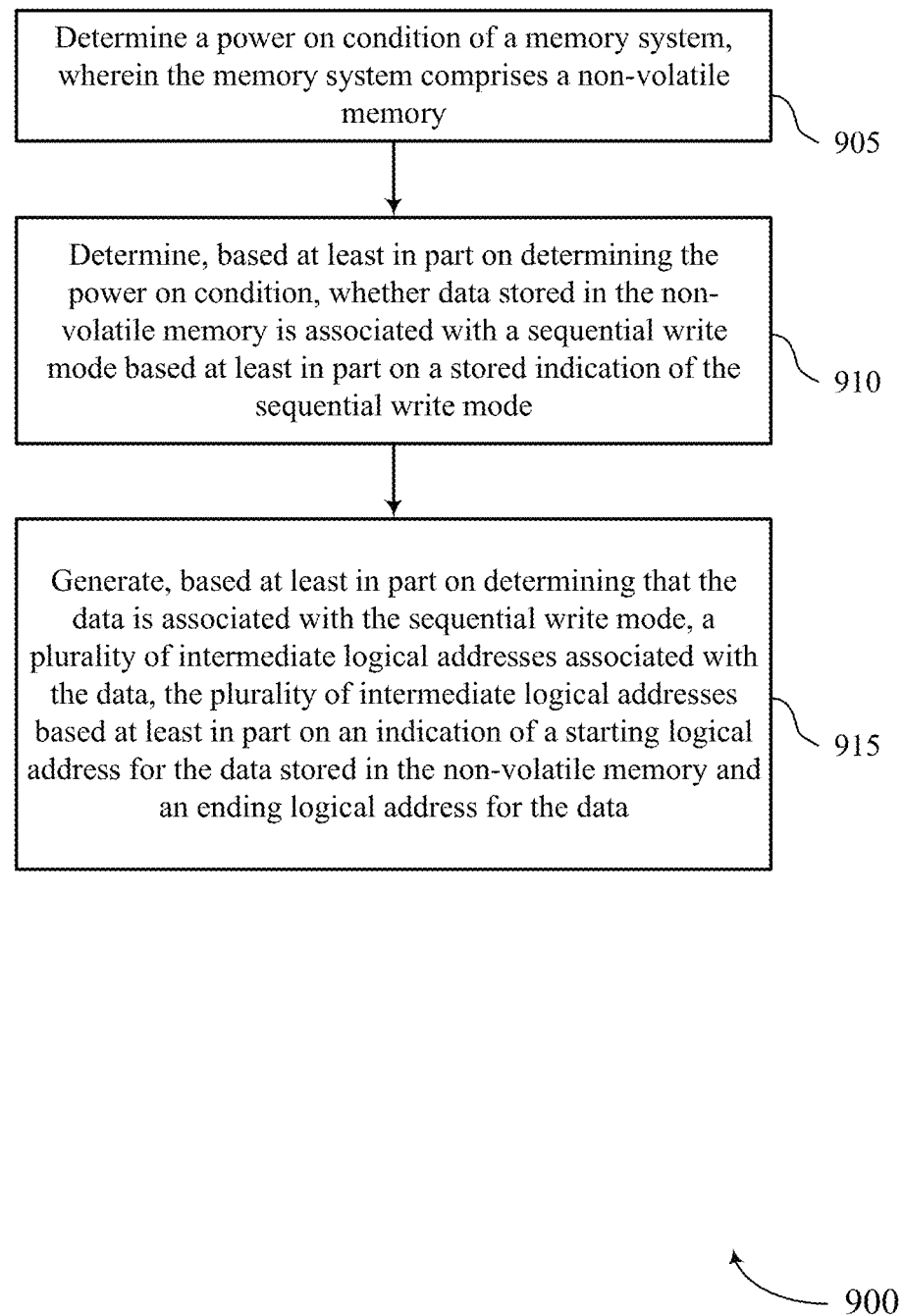

FIG. 9 shows a flowchart illustrating a method 900 that supports techniques for sequential access operations in accordance with examples as disclosed herein. The operations of method 900 may be implemented by a managed memory system or its components as described herein. For example, the operations of method 900 may be performed by a managed memory system as described with reference to FIGS. 1 through 7. In some examples, a managed memory system may execute a set of instructions to control the functional elements of the device to perform the described functions. Additionally or alternatively, the managed memory system may perform aspects of the described functions using special-purpose hardware.

At 905, the method may include determining a power on condition of a memory system, where the memory system includes a non-volatile memory. The operations of 905 may be performed in accordance with examples as disclosed herein. In some examples, aspects of the operations of 905 may be performed by a power management component 745 as described with reference to FIG. 7.

At 910, the method may include determining, based at least in part on determining the power on condition, whether data stored in the non-volatile memory is associated with a sequential write mode based at least in part on a stored indication of the sequential write mode. The operations of 910 may be performed in accordance with examples as disclosed herein. In some examples, aspects of the operations of 910 may be performed by a sequential write mode component 735 as described with reference to FIG. 7.

At 915, the method may include generating, based at least in part on determining that the data is associated with the sequential write mode, a plurality of intermediate logical addresses associated with the data, the plurality of intermediate logical addresses based at least in part on an indication of a starting logical address for the data stored in the non-volatile memory and an ending logical address for the data. The operations of 915 may be performed in accordance with examples as disclosed herein. In some examples, aspects of the operations of 915 may be performed by a memory address component 750 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 15: A method, apparatus, or non-transitory computer-readable medium including operations, features, circuitry, logic, means, or instructions, or any combination thereof for determining a power on condition of a memory system, where the memory system includes a non-volatile memory; determining, based at least in part on determining the power on condition, whether data stored in the non-volatile memory is associated with a sequential write mode based at least in part on a stored indication of the sequential write mode; and generating, based at least in part on determining that the data is associated with the sequential write mode, a plurality of intermediate logical addresses associated with the data, the plurality of intermediate logical addresses based at least in part on an indication of a starting logical address for the data stored in the non-volatile memory and an ending logical address for the data.

Aspect 16: The method, apparatus, or non-transitory computer-readable medium of aspect 15 where, generating the plurality of intermediate logical addresses includes operations, features, circuitry, logic, means, or instructions, or any combination thereof for retrieving the indication of the starting logical address from the non-volatile memory and determining the ending logical address based at least in part performing a search on a set of memory cells of the non-volatile memory, the set of memory cells starting from a starting physical address associated with the starting logical address.

Aspect 17: The method, apparatus, or non-transitory computer-readable medium of any of aspects 15 through 16, further including operations, features, circuitry, logic, means, or instructions, or any combination thereof for updating a mapping between logical addresses associated with the data and physical addresses associated with the data based at least in part on the plurality of intermediate logical addresses.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
non-volatile memory; and
processing circuitry coupled with the non-volatile memory, wherein the processing circuitry is configured to cause the memory system to:
receive, at the memory system, a first plurality of write commands associated with first data;
store, in the non-volatile memory based at least in part on receiving the first plurality of write commands, an indication of a starting logical address associated with the first data;
store, in the non-volatile memory based at least in part on determining that the first plurality of write commands are associated with a sequential write mode, an indication of the sequential write mode;
detect a condition to store an indication of a second logical address associated with the first data in the non-volatile memory; and
suppress storing the indication of the second logical address in the non-volatile memory based at least in part on the indication of the sequential write mode.

2. The memory system of claim 1, wherein the processing circuitry is further configured to cause the memory system to:
update a mapping between logical addresses associated with the first data and physical addresses in the non-volatile memory associated with the first data during the sequential write mode.

3. The memory system of claim 1, wherein the processing circuitry is further configured to cause the memory system to:
perform a first update operation to update a value of a counter indicating a quantity of suppressed indications, wherein the suppressing is based at least in part on the value of the counter.

4. The memory system of claim 3, wherein the processing circuitry is further configured to cause the memory system to:
initiate a checkpoint operation during the sequential write mode, wherein performing the first update operation is based at least in part on initiating the checkpoint operation; and
determine whether the checkpoint operation was initiated, wherein determining that the checkpoint operation was initiated during the sequential write mode is based at least in part on the value of the counter being greater than a zero value.

5. The memory system of claim 4, wherein the processing circuitry is further configured to cause the memory system to:
refrain from generating a checkpoint indication indicating that the checkpoint operation was initiated based at least in part on determining that the checkpoint operation was not initiated and based at least in part on the value of the counter indicating the quantity of suppressed indications.

6. The memory system of claim 4, wherein the processing circuitry is further configured to cause the memory system to:
performing a second update operation to update the value of the counter based at least in part on determining that the checkpoint operation was not initiated.

7. The memory system of claim 1, wherein the processing circuitry is further configured to cause the memory system to:
determine whether a second metric associated with a received second plurality of write commands satisfies a second threshold based at least in part on a respective logical address of each write command of the received second plurality of write commands.

8. The memory system of claim 7, wherein the processing circuitry is further configured to cause the memory system to:
exit the sequential write mode based at least in part on determining that the second metric satisfies the second threshold; and
update a mapping between logical addresses associated with the first data and physical addresses in the memory system associated with the first data based at least in part on exiting the sequential write mode.

9. The memory system of claim 1, wherein the processing circuitry is further configured to cause the memory system to:
update, based at least in part on storing the first data, a mapping between logical addresses associated with the first data and physical addresses associated with the first data in the memory system based at least in part on determining whether the first data associated with the first plurality of write commands fills a block of memory cells of the memory system.

10. The memory system of claim 9, wherein the processing circuitry is further configured to cause the memory system to:
compress the mapping between logical addresses and physical addresses based at least in part on the starting logical address associated with the first data.

11. The memory system of claim 1, wherein the processing circuitry is further configured to cause the memory system to:
determine, during the sequential write mode, whether second data associated with a received first write command is sequential with the first data associated with the first plurality of write commands based at least in part on a first logical address of the second data associated with the received first write command; and
store, based at least in part on determining that the second data associated with the received first write command is sequential with the first data associated with the first plurality of write commands, an indication of the first logical address in a first pointer list.

12. The memory system of claim 11, wherein the processing circuitry is further configured to cause the memory system to:

determine, during the sequential write mode, whether third data associated with a received second write command is sequential with the second data based at least in part on a second logical address of the third data associated with the received second write command; and store, based at least in part on determining that the third data is not sequential with the second data, an indication of the second logical address in a second pointer list.

13. A non-transitory computer-readable medium storing code, the code comprising instructions executable by processing circuitry to:

receive, at a memory system comprising a non-volatile memory, a first plurality of write commands associated with first data;

store, in the non-volatile memory based at least in part on receiving the first plurality of write commands, an indication of a starting logical address associated with the first data;

store, in the non-volatile memory based at least in part on determining that the first plurality of write commands are associated with a sequential write mode, an indication of the sequential write mode;

generate an indication to store an indication of a second logical address associated with the first data in the non-volatile memory; and suppress storing the indication of the second logical address based at least in part on the indication of the sequential write mode.

14. The non-transitory computer-readable medium of claim 13, wherein the instructions are further executable by the processing circuitry to:

update a mapping between logical addresses associated with the first data and physical addresses in the non-volatile memory associated with the first data in the non-volatile memory during the sequential write mode.

15. The non-transitory computer-readable medium of claim 13, wherein the instructions are further executable by the processing circuitry to:

perform a first update operation to update a value of a counter indicating a quantity of suppressed indications, wherein the suppressing is based at least in part on the value of the counter.

16. The non-transitory computer-readable medium of claim 15, wherein the instructions are further executable by the processing circuitry to:

initiate a checkpoint operation during the sequential write mode, wherein performing the first update operation is based at least in part on initiating the checkpoint operation; and determine whether the checkpoint operation was initiated, wherein determining that the checkpoint operation was initiated during the sequential write mode is based at least in part on the value of the counter being greater than a zero value.

17. The non-transitory computer-readable medium of claim 16, wherein the instructions are further executable by the processing circuitry to:

refrain from generating a checkpoint indication indicating that the checkpoint operation was initiated based at least in part on determining that the checkpoint operation was not initiated and based at least in part on the value of the counter indicating the quantity of suppressed indications.

18. The non-transitory computer-readable medium of claim 16, wherein the instructions are further executable by the processing circuitry to:

performing a second update operation to update the value of the counter based at least in part on determining that the checkpoint operation was not initiated.

19. The non-transitory computer-readable medium of claim 13, wherein the instructions are further executable by the processing circuitry to:

determine whether a second metric associated with a received second plurality of write commands satisfies a second threshold based at least in part on a respective logical address of each write command of the received second plurality of write commands.

20. A memory system, comprising:

processing circuitry associated with one or more memory devices, wherein the processing circuitry is configured to cause the memory system to:

determine a power-on condition of the memory system;

determine, based at least in part on determining the power-on condition, whether data stored prior to the power-on condition in the memory system is associated with a sequential write mode based at least in part on a stored indication of the sequential write mode; and generate, based at least in part on determining that the data is associated with the sequential write mode, a plurality of intermediate logical addresses associated with the data stored prior to the power-on condition.

* * * * *